(12) United States Patent
Galli et al.

(10) Patent No.: US 12,393,778 B2
(45) Date of Patent: Aug. 19, 2025

(54) METHOD AND SYSTEM FOR CUSTOMIZING A DICTIONARY

(71) Applicant: HCL Technologies Italy S.p.A., Milan (IT)

(72) Inventors: Valerio Galli, Rome (IT); Andrea Graziani, Rome (IT); Marco Masciovecchio, L'Aquila (IT); Filippo Pepe, Ciampino (IT)

(73) Assignee: HCL Technologies Italy S.p.A., Milan (IT)

( * ) Notice: Subject to any disclaimer, the term of this patent is extended or adjusted under 35 U.S.C. 154(b) by 249 days.

(21) Appl. No.: 18/221,876

(22) Filed: Jul. 13, 2023

(65) Prior Publication Data

US 2025/0021757 A1    Jan. 16, 2025

(51) Int. Cl.
| | | |
|---|---|---|
| G06F 40/00 | (2020.01) |
| G06F 16/2457 | (2019.01) |
| G06F 40/242 | (2020.01) |

(52) U.S. Cl.
CPC ...... G06F 40/242 (2020.01); G06F 16/24578 (2019.01)

(58) Field of Classification Search
CPC ...... G06F 40/166; G06F 40/10; G06F 40/126; G06F 40/103; G06F 40/242; G06F 40/237; G06F 40/247; G06F 40/274; G06F 40/284; G06F 40/289; G06F 40/295; G06F 40/30; G06F 40/53; G06F 40/56; G06F 7/588; G06F 16/22; G06F 16/24575; G06F 16/2453; G06F 18/22; G06F 21/602; G10H 2240/111; G10H 2240/105; G06Q 50/01; G06Q 20/401; G16B 50/40; H04L 63/0414; H04L 9/008; H04L 63/0428; H04L 9/06; H04L 2209/04; H04L 9/065; H04L 9/0656; G06N 3/045; G06N 3/08; G06N 3/0475; G06N 3/094; G06N 3/047; G10L 17/24;

(Continued)

(56) References Cited

U.S. PATENT DOCUMENTS

| | | | |
|---|---|---|---|
| 7,827,165 B2 | 11/2010 | Abernethy, Jr. et al. | |
| 9,288,039 B1 * | 3/2016 | Monet | H04L 9/008 |

(Continued)

OTHER PUBLICATIONS

Aikaterini Kanta and Mark Scanlon, A Novel Dictionary Generation Methodology for Contextual-Based Password Cracking, IEEE Access, Jun. 2, 2022, 59178-59188.

(Continued)

*Primary Examiner* — Edgar X Guerra-Erazo
(74) *Attorney, Agent, or Firm* — Kendal M. Sheets

(57) ABSTRACT

A method and system for customizing a dictionary for a user is disclosed. The method includes capturing data with respect to the user from a plurality of platforms; generating a words-list including a plurality of words based on the captured data; determining a set of words from the words-list based on a predefined word-length criteria; determining a subset of words from the set of words based on a predefined word-frequency criteria; assigning a weight corresponding to each word of the subset of words to generate a weighted words-list based on presence of special characters in each word of the subset of words and a frequency of occurrence of each word in the subset of words; and dynamically updating the dictionary based on the weighted words-list.

20 Claims, 9 Drawing Sheets

(58) Field of Classification Search
CPC ......... G10L 17/14; G10L 15/02; G10L 15/05; G10L 15/04; G10L 17/06; G10L 17/18; G10L 17/20; G10L 17/22
See application file for complete search history.

(56) References Cited

U.S. PATENT DOCUMENTS

| | | | |
|---|---|---|---|
| 9,396,178 B2 | 7/2016 | Goud et al. | |
| 9,621,348 B2 | 4/2017 | Bahjat | |
| 11,537,626 B2* | 12/2022 | Tang | G06F 16/2228 |
| 12,041,176 B2* | 7/2024 | Uchida | H04L 9/008 |
| 2009/0174667 A1* | 7/2009 | Kocienda | G06F 3/04895 |
| | | | 345/169 |
| 2010/0114887 A1 | 5/2010 | Conway et al. | |
| 2012/0159180 A1* | 6/2012 | Chase | H04L 9/0869 |
| | | | 713/184 |
| 2012/0304100 A1* | 11/2012 | Kocienda | G06F 3/04817 |
| | | | 715/773 |
| 2013/0046995 A1* | 2/2013 | Movshovitz | H04L 9/0662 |
| | | | 713/189 |
| 2015/0317078 A1* | 11/2015 | Kocienda | G06F 3/04842 |
| | | | 715/773 |
| 2016/0328147 A1* | 11/2016 | Zhang | G06F 3/04847 |
| 2019/0187892 A1* | 6/2019 | Kocienda | G06F 3/04842 |
| 2020/0372023 A1* | 11/2020 | Tang | G06F 21/6227 |
| 2021/0349631 A1* | 11/2021 | Kocienda | G06F 3/04817 |
| 2022/0311621 A1* | 9/2022 | Uchida | H04L 9/008 |

OTHER PUBLICATIONS

Jegor Van Opdorp, Using A.I. to generate meaningful passwords, Leafcloud, Dec. 10, 2020.
John R. Levine, Diceware, Wikipedia, Internet Secrets, 2nd Edition, Chapter 37, IDG Books, 2000, ISBN 0-7645-3239-1.
Arnold G. Reinhold, The Diceware Passphrase, Cambridge, Massachusetts USA.
Arnold G. Reinhold, Diceware Passphrase Lookup and Generator, Jan. 8, 2016.
Chris Hoffman, How to Create a Strong Password (and Remember It), How-To Geek, May 19, 2023.

* cited by examiner

METHOD AND SYSTEM FOR CUSTOMIZING A DICTIONARY

TECHNICAL FIELD

Generally, the invention relates to data protection. More specifically, the invention relates to method and system for customizing a dictionary for a user.

BACKGROUND

In the era of information technology, various online platforms require creation of online profiles and corresponding passwords. The online profiles and corresponding passwords may be used every time for user authentication. Since only one platform cannot fulfil all needs of a user, which means one profile and corresponding password may not be useful for all the platforms. Further, users often need to generate new passwords for online services, but there is a trade-off between human memory and security. For security purposes, the users choose to create complicated passwords for example, with special characters, numbers, and case variations. These kind of passwords may be strong and provide high security, however, remembering many complicated passwords becomes challenging for the users.

Additionally, passphrases (which are longer phrases) have become a best practice for enhanced security, where the users are supposed to enter phrases instead of single words. However, long passphrases are also challenging to remember, leading the users to store them in insecure locations like agendas. This compromises security and defeats the purpose of creating complex passphrases. In other words, the phrases also include some numbers or special characters or both. Thus, the problem occurs here as well, even though the passphrases are stronger than the passwords. To tackle this issue, the users use phrases that are short, easy-to-guess, or familiar phrases (for example, a phrase from pop culture or their favorite book or movie). These phrases may be easy for the users to remember but also easy for the hackers to guess, as dictionary of users' vocabulary is quite limited. Hackers can also throw variations, by appending letters with numbers and special characters (e.g., substituting the letter O with number 0) and eventually succeed.

This highlights a need to find a balance between strong security measures and user-friendly practices.

SUMMARY

In one embodiment, a method for customizing a dictionary for a user is disclosed. In one embodiment the method may include capturing data with respect to the user from a plurality of platforms. The data may be indicative of user specific words preferences. The method may further include generating a words-list including a plurality of words based on the captured data. The method may further include determining a set of words from the words-list based on a predefined word-length criteria. The method may further include determining a subset of words from the set of words based on a predefined word-frequency criteria. The method may further include assigning a weight corresponding to each word of the subset of words to generate a weighted words-list based on presence of special characters in each word of the subset of words and a frequency of occurrence of each word in the subset of words. The method may further include dynamically updating the dictionary based on the weighted words-list. The dictionary may include a plurality of encrypted random words.

In another embodiment, a system for customizing a dictionary for a user is disclosed. The system may include a processor and a memory communicatively coupled to a processor. The memory may store processor executable instructions, which, on execution, may cause the processor to capture data with respect to the user from a plurality of platforms. The data may be indicative of user specific words preferences. The processor-executable instructions, on execution, may further cause the processor to generate a words-list including a plurality of words based on the captured data. The processor-executable instructions, on execution, may further cause the processor to determine a set of words from the words-list based on a predefined word-length criteria. The processor-executable instructions, on execution, may further cause the processor to determine a subset of words from the set of words based on a predefined word-frequency criteria. The processor-executable instructions, on execution, may further cause the processor to assign a weight corresponding to each word of the subset of words to generate a weighted words-list based on presence of special characters in each word of the subset of words and a frequency of occurrence of each word in the subset of words. The processor-executable instructions, on execution, may further cause the processor to dynamically update the dictionary based on the weighted words-list, wherein the dictionary may include a plurality of encrypted random words.

In yet another embodiment, a non-transitory computer-readable medium storing computer-executable instructions for customizing a dictionary for a user is disclosed. The stored information, when executed by a processor, may cause the processor to perform operations including capturing data with respect to the user from a plurality of platforms. The data is indicative of user specific words preferences. The operations may further include generating a words-list including a plurality of words based on the captured data. The operations may further include determining a set of words from the words-list based on a predefined word-length criteria. The operations may further include determining a subset of words from the set of words based on a predefined word-frequency criteria. The operations may further include assigning a weight corresponding to each word of the subset of words to generate a weighted words-list based on presence of special characters in each word of the subset of words and a frequency of occurrence of each word in the subset of words. The operations may further include dynamically updating the dictionary based on the weighted words-list. The dictionary may include a plurality of encrypted random words.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
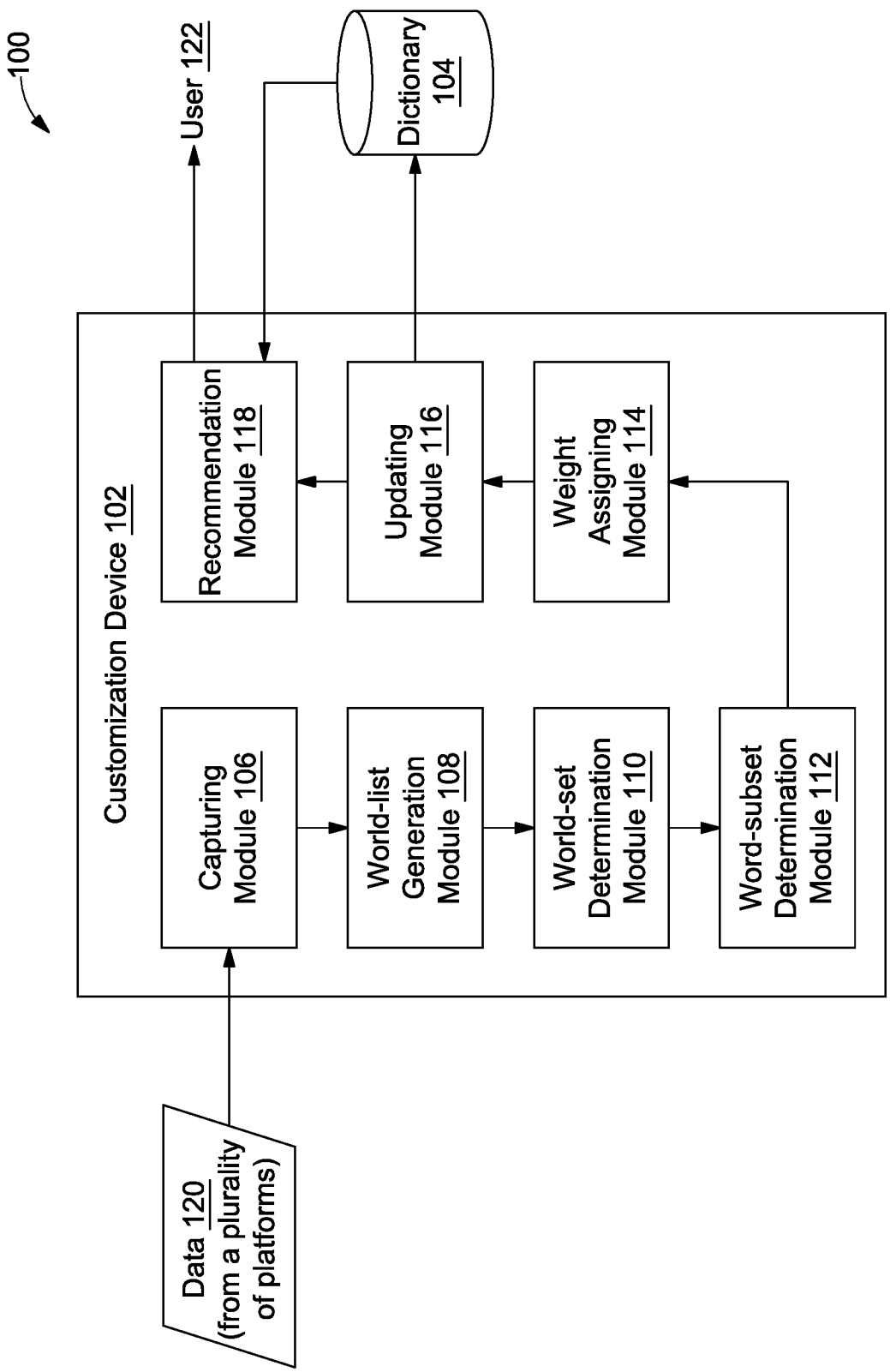
FIG. 1 illustrates a functional block diagram of a customization device within a system for customizing a dictionary for a user, in accordance with some embodiments of the present disclosure.

Referring now to FIG. 1, a functional block diagram of a customization device 102 within a system 100 configured for customizing a dictionary 104 is illustrated, in accordance with some embodiments. The system 100 may include a customization device 102. The customization device 102 may perform various operations for customizing the dictionary 104. Further, to perform the operation, the customization device 102 may include various modules including a capturing module 106, a word-list generation module 108, a word-set determination module 110, a word-subset determination module 112, a weight assigning module 114, an updating module 116, and a recommendation module 118. Also, the customization device 102 may include a datastore (not shown in FIG. 1) for storing various data and intermediate results generated by the modules 106-118.

The capturing module 106 may be configured for capturing data 120 with respect to a user 122 from a plurality of platforms. It should be noted that the data 120 is indicative of user specific words preferences. The data 120 may be based on personal interests or conversation subjects of the user 122. For example, a personal way of writing abbreviation of common words, slang terms, names of brands or pets, nicknames, and the like. The plurality of platforms may include, but are not limited to, key logging services, social media platforms, messaging platforms, and applications. In some embodiments, the capturing module 106 may monitor the user 122 while visiting the plurality of platforms to identify frequently used words by the user 122. For example, the capturing module 106 may capture the data 120 from newsletters and articles written by the user 122 on various news outlets, blogs written by the user 122, social media posts of the user 122, messages sent by the user 122, the most pressed keys, and the like. This data 120 may include words and phrases familiar to the user 122 which may be processed further to communicatively coupled the word-list generation module 108.

The word-list generation module 108 may be configured for creating a words-list based on the captured data 120. The word-list may include a plurality of words preferred by the user 122. In other words, the word-list generation module 106 may utilize the data 120 captured using the capturing module 106 and generate a list of words familiar to the user 122. By way of an example, the word-list generation module 108 may generate the word-list based on words captured based on the personal way of writing abbreviation of common words of the user 122, slang terms used by the user 122, names of brands or pets used by the user 122, nicknames used by the user 122, and the like. Further, the word-list may be sent to the operatively coupled word-set determination module 110.

The word-set determination module 110 may determine a set of words from the words-list. It should be noted that a predefined word-length criteria may be considered for determining the set of words. In some embodiments, each word from the plurality of words of the words-list may be validated based on the predefined word-length criteria, for determining the set of words. When the validation is successful for a word of the plurality of words of the word-list, the word may be selected to generate the set of words. Alternatively, when the validation is unsuccessful for that word, the word may be rejected to generate the set of words. One or more words of the plurality of words of the word-list passing the validation may form the set of words.

In other words, the word-set determination module 110 may check for all of the plurality of words within the word-list to determine the set of words and then eliminate some of the plurality of words with lengths out of a predefined word length range. By way of an example, consider that the predefined length criteria include a range 4 to 7 (i.e., 4<=length<=7). In that case, only words with word lengths within the range 4 to 7 (i.e., 4<=length<=7) may form the set of words. Further, consider that the word-list includes words "Cat" (with one time occurrence), "Sorry"

(with five time occurrence), "Morning" (with ten time occurrence), "Beautiful" (with seven time occurrence), "Thanks" (with fifteen time occurrence), "Good" (with four time occurrence), "Busy" (with five time occurrence), "Urgent" (with two time occurrence), and "Floor" (with six time occurrence). Word lengths corresponding to these words are "3", "5", "7", "9", "6", "4", "4", "6", and "5", respectively. Since the word length criteria range is 4 to 7, the words "Cat", and "Beautiful" may be rejected or filtered out, in the validation process. As their respective lengths "3" and "9" are out of the range "4<=length<=7". Further, the words "Sorry", "Morning", "Thanks", "Good", "Busy", "Urgent", and "Floor" may be selected in the validation process. As their respective lengths "5", "7", "6", "4", "4", "6", and "5", respectively, are within the range "4<=length<=7". Thus, in such a case, the set of words may include the words "Sorry", "Morning", "Thanks", "Good", "Busy", "Urgent", and "Floor". Further, the set of words may be passed to the word-subset determination module 112.

The word-subset determination module 112 may be configured to determine a subset of words from the set of words based on a predefined word-frequency criteria. In some embodiments, each word within the set of words may be validated based on the predefined word-frequency criteria. When the validation is successful for a word of the set of words when checked based on the predefined frequency criteria, the word may be selected for determining the subset of words. Otherwise, when the validation is unsuccessful, the word may be rejected and may not be included in the subset of words.

In continuation to the previous example, the words within the set of words "Sorry", "Morning", "Thanks", "Good", "Busy", "Urgent", and "Floor" may be checked for further validation process based on the predefined frequency criteria. As already mentioned, further frequency of occurrence of these words are "3", "10", "15", "4", "1", "2", and "6", respectively. In one scenario consider that the predefined frequency criteria include a frequency value "5", which means words occurring less than five times in the set of words may be rejected or filtered out, for determining the subset of words. In such a scenario, the words "Sorry", "Good", "Busy", and "Urgent" may be rejected and may not be included in the subset of words, as frequency of occurrence of these words (i.e., 3, 4, 1, and 2) is less than the frequency value (i.e., 5). The words "Morning", "Thanks", and "Floor" may be selected and included in the subset of words, as frequency of occurrence of these words (i.e., 10, 15, and 6) is greater than the predefined value (i.e., 5). Thus, the subset of words in this case may include the words "Morning", "Thanks", and "Floor". Further, the word-subset determination module 112 may be communicatively coupled to the weight assigning module 114.

The weight assigning module 114 may be configured for assigning a weight corresponding to each word of the subset of words to generate a weighted words-list. The weight may be assigned based on presence of special characters in each word of the subset of words and a frequency of occurrence of each word in the subset of words. In some embodiments, the words of the subset of words may be awarded weight points. For example, one weight point may be awarded for each occurrence and one weight point may be awarded for each special character. With regards to the previous example, the weight points may be assigned based on the frequency of occurrence only, as there is no special character in any of the words "Morning", "Thanks", and "Floor". Thus, the word "Morning" may be awarded ten weight points as its frequency of occurrence is "10" and the word "Thanks" may be awarded fifteen weight points as its frequency of occurrence is "15". Similarly, the word "Floor" may be awarded six weight points as its frequency of occurrence is "6".

By way of another example, for a word "$tr0ng" occurring seven times in a subset of words may be awarded eight weight points, one for a special character "$", and seven for the frequency of occurrence of the word "$tr0ng". As the words with less than frequency value '5' are discarded earlier, minimum weight points awarded to any word may be '5'. Further, based on the weight points, weight may be assigned to the each word of the subset of words. For example, weight '1' is assigned to words with weight points '5 to 8', weight '2' is assigned to words with weight points '9 to 12', weight '3' is assigned to words with weight points '13 to 17', weight '4' is assigned to words with weight points '18 to 22', weight '5' is assigned to words with weight points greater than '22'. The weight assigning module 114 may be operatively coupled to the updating module 116.

The updating module 116 may dynamically update the dictionary 104 based on the weighted words-list. The dictionary 104 may include a plurality of encrypted random words. This updated dictionary may be further used for providing recommendations to the user 122 with the help of recommendation module 118. The recommendations may be for generating passphrases using the updated dictionary. In other words, when the list of weighted words is formed it may be passed to update the dictionary 104 and the dictionary 104 may be accessed by the recommendation module 118 for generating recommendations and suggestions for the user 122. With regards to the dictionary 104, the dictionary 104 may be considered as the updated dictionary when the weighted words-list is empty. Further, to update the dictionary 104, the updating module 116 may match each word within the weighted words-list with each word of the plurality of encrypted random words within the dictionary 104. For example, a first word within the weighted words-list may be matched with each of the plurality of encrypted random words within the dictionary 104. In case the first word is successfully matched with an encrypted random word, a weight of the encrypted random word corresponding to the first word within the dictionary 104 may be updated to update the dictionary 104. Otherwise, when the first word is not matched with any of the plurality of encrypted random words or when the matching is unsuccessful, a lowest weighted encrypted random word within the dictionary 104 may be replaced with the first word to update the dictionary 104. Also, it should be noted that a number of the plurality of encrypted random words within the dictionary may always remain same, i.e., either the weight is updated, or a word is replaced with a new word.

Figure 2:
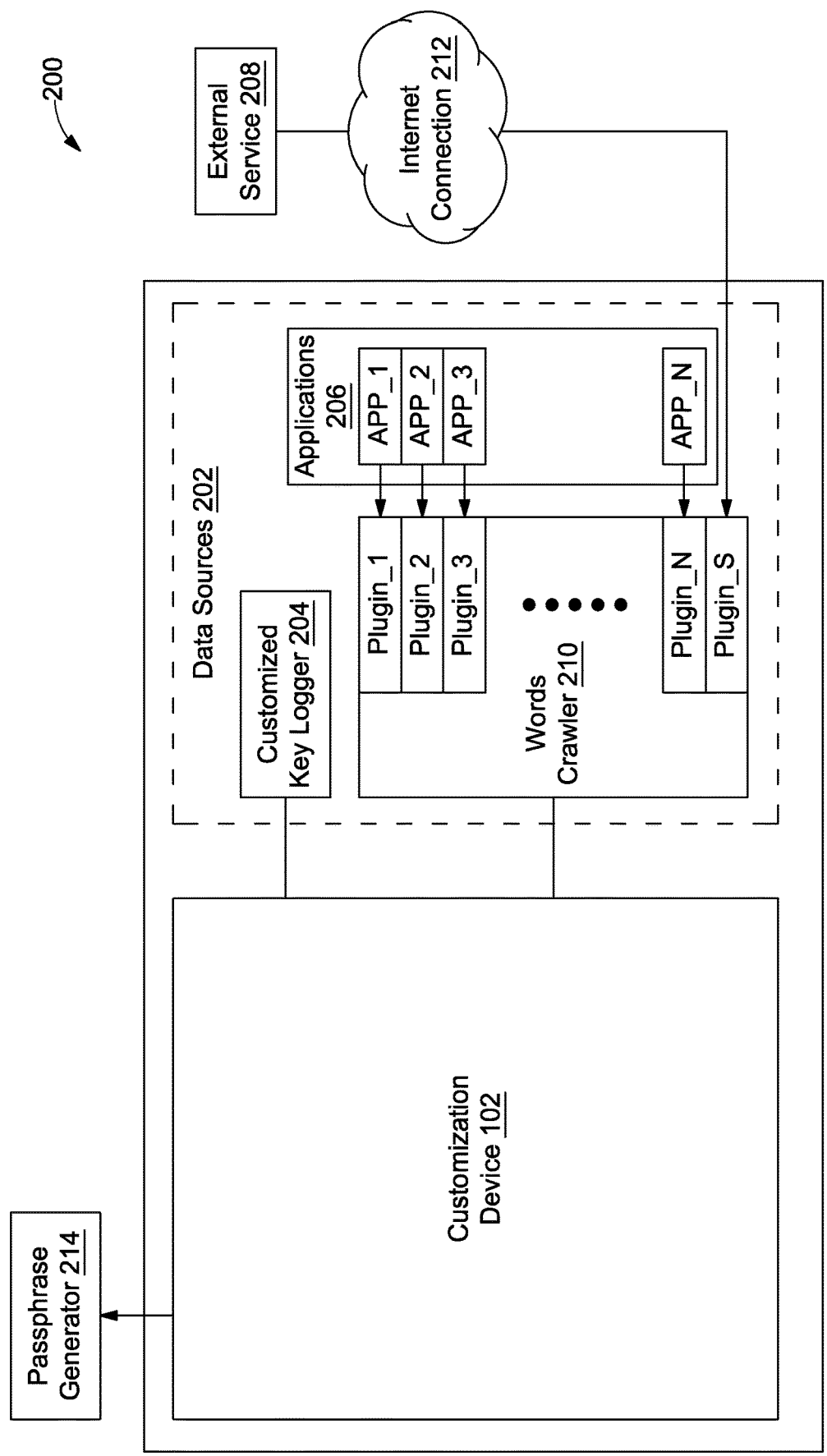
FIG. 2 illustrates a block diagram of a system for customizing a dictionary for a user, in accordance with some embodiments of the present disclosure.

Referring now to FIG. 2, a block diagram of a system 200 for customizing a dictionary (same as the dictionary 104) is illustrated, in accordance with some embodiments. The system 200 may include a customization device 102. Functions of the customization device 102 are already explained in detail in conjunction with FIG. 1. The system 200 may further include various data sources 202. The data sources 202 may correspond to the plurality of platforms from where data (such as the data 120) may be provided to the customization device '102. The data sources 202 may include, but are not limited to, key logging services, social media platforms, messaging platforms, and applications. For example, as illustrated in FIG. 2, the data sources 202 may include a customized key logger 204, applications 206 (i.e., App_1, App_2, App_3. . . . App_N), and an external service 208.

Data from the applications 206 and the external service may be extracted via a word crawler 210, and corresponding plugins (i.e., plugin_1, plugin_2, plugin_3, plugin_N, and plugin_S). For example, data from the external service 208 may be fetched using the Plugin_S and through the word crawler 210. The plugin_S may communicate with the external service 208 via an internet connection 212. Further, the customization device 102 may use the data fetched from the data sources 202 and perform various operation as explained in FIG. 1, to update the dictionary. Based on an updated dictionary passphrase generator 214 may generate and suggest passphrases to the user 122.

In short, at starting, data may be collected in several ways, for example from various platforms including a smart key-logging service as well as several interfaces with the most common social and messaging applications. The data may be analyzed to create the weighted word-list. Further, words within the data may be passed through a length filter, where some of the words may be rejected and some of the words with suitable sizes may be selected to pass through a frequency filter. The frequency filter may pass some words with suitable frequencies and reject remaining words. The words passing both the filters may be considered suitable for the weighted word-list in terms of size and frequency. Further, weights may be assigned to these words, mainly based on its frequency, but also be affected by the presence of special characters, accented letters, mixed casing and/or coexistence of letters and non-letter characters, to generate the weighted word-list. A fine tuning of parameters may be performed for words weighting, and possibly for aimed weight reduction of most used words in a current language (e.g., common adverbs). The dictionary may be updated based on the weighted word-list. The customized dictionary may be highly enriched with words that are based on a customized user experience like personal abbreviations and personal-taste-based words which consists in a perfect starting point to generate easy to remember passphrases.

Further, a base dictionary generation includes picking a bunch of random words in a dice-ware fashion. The dice-ware fashion includes a series of physical six-sided die rolls that provides a set of digits aggregated to form five-digits numbers. The dictionary provides a correspondence between each number and a word (usually short) in the preferred language. The passphrase is an aggregation of the words randomly chosen by the dice throws. Each word adds "12.9 bits" of entropy to the passphrase, so for example, a 5 words passphrase would represent "64.6 bits" of entropy, which is generally considered a very strong security level. Feeding a dice-ware algorithm with the custom dictionary dramatically improves easiness to remember such long passphrases, allowing users to avoid insecure password preservation methods. As an example, as a starting point, to avail an immediate working solution, the standard dictionary may be adopted. A weight value of "0" may be assigned to all the words, at the beginning.

It should be noted that the system 100 and associated customization device 102 may be implemented in programmable hardware devices such as programmable gate arrays, programmable array logic, programmable logic devices, or the like. Alternatively, the system 100 and customization device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for customizing the dictionary 104 for the user 122. For example, the exemplary system 100 and the customization device 102 may customize the dictionary 104, by the process discussed herein. In particular, as will be appreciated by those of ordinary skill in the art, control logic and/or automated routines for performing the techniques and steps described herein may be implemented by the system 100 and the customization device 102 either by hardware, software, or combinations of hardware and software. For example, suitable code may be accessed and executed by the processor (not shown in FIG. 1) in the customization device 102 to perform some or all of the techniques described herein. Similarly, application specific integrated circuits (ASICs) configured to perform some or all the processes described herein may be included in the processor in the customization device 102.

Figure 3:
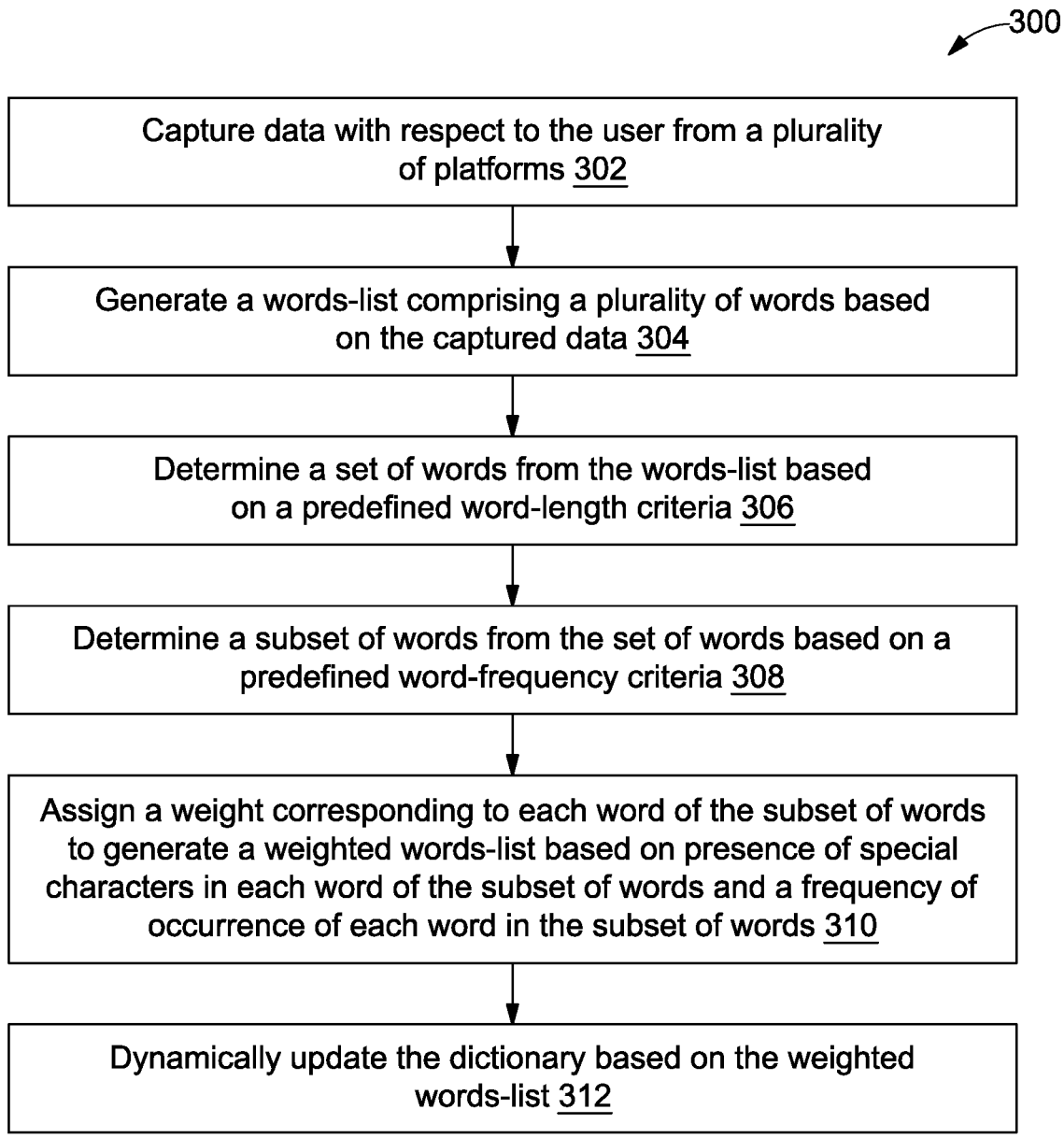
FIG. 3 illustrates a flowchart of a method for customizing a dictionary for a user, in accordance with some embodiments of the present disclosure.

Referring now to FIG. 3, a process for customizing a dictionary for a user is depicted via a flowchart, in accordance with an embodiment. Each step of the process is performed by a customization device (same as the customization device 102). FIG. 3 is explained in conjunction with FIGS. 1-2.

At step 302, data with respect to the user may be captured. It should be noted that the data (same as the data 120) may be captured from a plurality of platforms. This step may be performed using a capturing module (such as the capturing module 106). The plurality of platforms may be, but is not limited to, key logging services, social media platforms, messaging platforms, and applications. The data may be based on personal interests or conversation subjects of the user. For example, a personal way of writing abbreviation of common words, slang terms, names of brands or pets, nicknames, and the like. Further, at step 304, a word-list may be generated based on the captured data using a word-list generation module (same as the word-list generation module 108). The word-list may include a plurality of words.

Thereafter, at step 306, a set of words may be determined from the words-list. It should be noted that a predefined word length criteria may be considered for determining the set of words. This step is performed using a word-set determination module (such as the word-set determination module 110). Further, at step 308, a subset of words may be created from the set of words based on a predefined word frequency criteria, using a word-subset determination module (same as the word-subset determination module 112). The subset may be formed based on frequency of occurrence of the words. A predefined frequency value may be set in the word-subset determination module. Thus, words having frequency values lesser than the predefined frequency value may be filtered out.

Further, at step 310, a weight corresponding to each word of the subset of the words may be assigned, using a weight assigning module (same as the weight assigning module 114). The weight may be assigned based on presence of special characters in each word of the subset of words and a frequency of occurrence of each word in the subset of words. Thus, a weighted words-list may be generated. For example, each special character may be responsible for one weight point and each frequency of occurrence is responsible for one weight point.

Further, at step 312 the dictionary (same as the dictionary 104) may be updated dynamically based on the weighted word-list. This step is performed through an updating module (such as the updating module 116) The dictionary may include a plurality of encrypted random words. In some embodiments, the updated dictionary may be used for providing suggestions to the user. To provide suggestions, a recommendation module may be employed (for example, the recommendation module 118) For example, the suggestions may be provided for generating passphrases that are difficult to breach and easy to remember.

Figure 4:
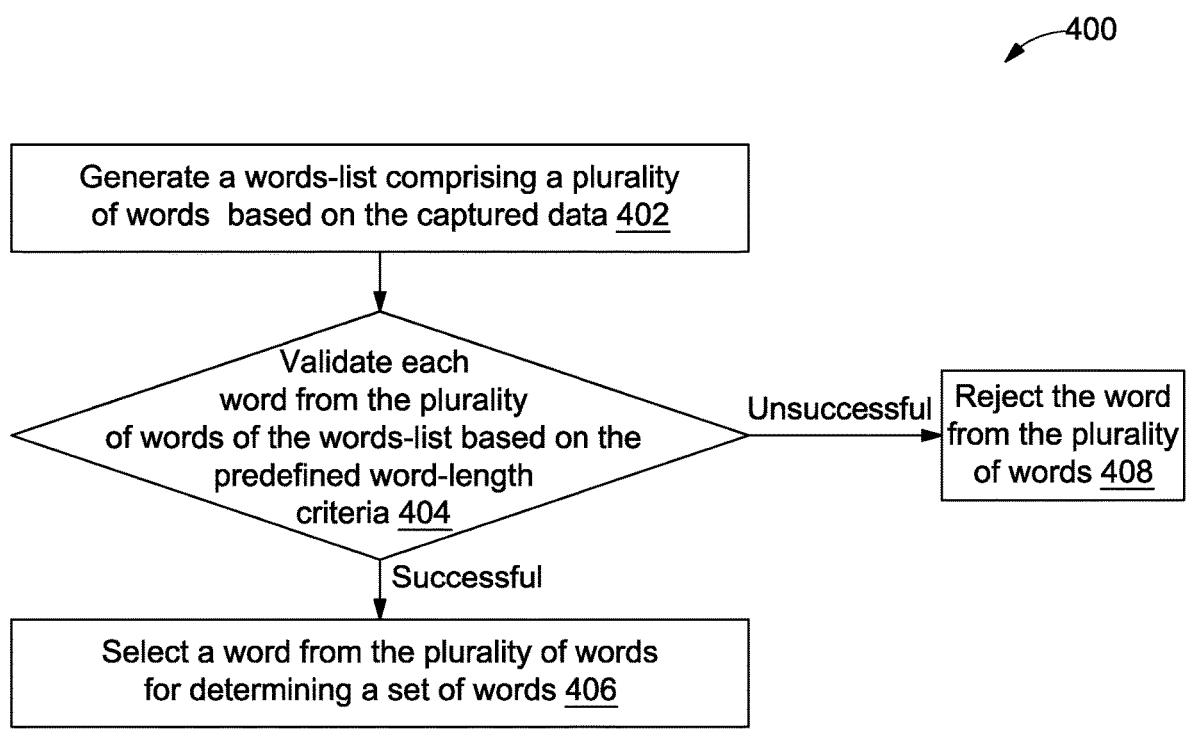
FIG. 4 is a flowchart of a method for determining a set of words while customizing a dictionary, in accordance with some embodiments of the present disclosure.

Referring now to FIG. 4, a method 400 for determining a set of words while customizing a dictionary is depicted via a flowchart, in accordance with an embodiment. Each step of the process may be performed by a word-set determination module (such as the word-set determination module 110). FIG. 4 is explained in conjunction with FIGS. 1-3.

At step 402, a words-list that includes the plurality of words may be generated, based on the captured data. At step 404, each word from the plurality of words present in the word-list may be validated based on the predefined word length criteria. Thereafter, at step 406, a word may be selected from the plurality of words, for determining the set of words, when the validation of the word is successful. Otherwise, when the validation of the word unsuccessful, the words may be rejected or filtered out for determining the set of words.

By way of an example, all of the plurality of words within the word-list may be checked based on the predefined length criteria to determine the set of words, and words with lengths out of a predefined word length range may be rejected. By way of an example, consider that the predefined length criteria include a range 2 to 4 (i.e., $2<=\text{length}<=4$). In that case, only words with word lengths within the range 2 to 4 (i.e., $2<=\text{length}<=4$) may form the set of words. Further, for example, consider that the word list includes words "Sorry" (with five time occurrence), "Morning" (with ten time occurrence), "Beautiful" (with seven time occurrence), "Thanks" (with fifteen time occurrence), "Busy" (with five time occurrence), "Urgent" (with two time occurrence), and "Floor" (with six time occurrence). Word lengths corresponding to these words are "5", "7", "9", "6", "4", "6", and "5", respectively. Since the word length criteria range is 2 to 4, except the words "Busy" all other words may be rejected or filtered out, in the validation process, as their lengths are out of the range "$2<=\text{length}<=4$". Thus, only the word "Busy" may be selected in the validation process.

Figure 5:
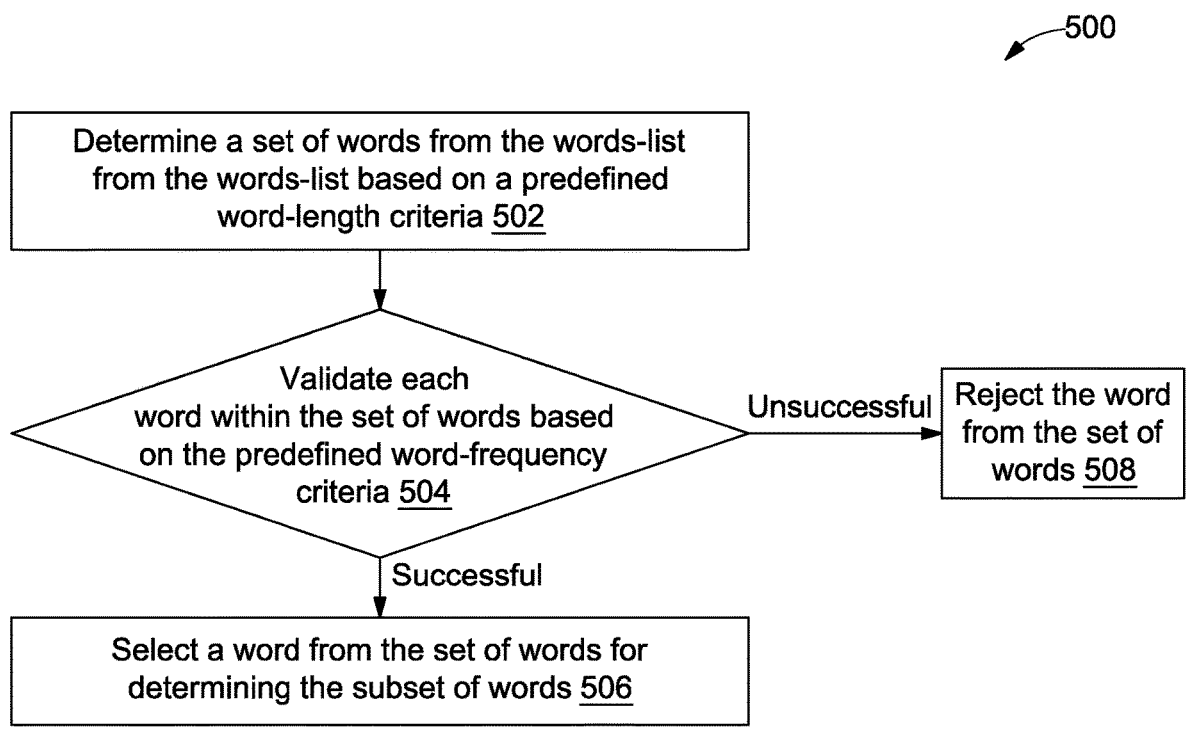
FIG. 5 is a flowchart of a method for determining a subset of words while customizing a dictionary, in accordance with some embodiments of the present disclosure.

Referring now to FIG. 5, a method 500 for determining a subset of words while customizing a dictionary is depicted via a flowchart, in accordance with an embodiment. Each step of the process may be performed by a word-subset determination module (such as the word-subset determination module 112). FIG. 5 is explained in conjunction with FIGS. 1-4.

At step 502, the set of words may be determined from the words-list based on a predefined word-length criteria. At step 504, each word within the set of words may be validated based on the predefined word-frequency criteria, for determining the subset of words. In some embodiments, at step 506, a word from the set of words may be selected for determining the subset of words when the validation is successful for the word. Alternatively, at step 508, when the validation of the word is unsuccessful, the word from the set of words may be rejected.

By way of an example, consider that the words within the set of words are "Sorry", "Morning", "Thanks", and "Good". These words may be checked for further validation process based on the predefined frequency criteria. Further consider that frequency of occurrence of these words are, respectively, "3", "10", "15", and "4". In one scenario consider that the predefined frequency criteria include a predefined frequency value "5", which means words occurring less than five times in the set of words may be rejected or filtered out, for determining the subset of words. In such a scenario, the words "Sorry", and "Good" may be rejected and may not be included in the subset of words, as frequency of occurrence of these words (i.e., 3, and 4) is lesser than the predefined frequency value (i.e., 5). The words "Morning", and "Thanks" may be selected and included in the subset of words, as frequency of occurrence of these words (i.e., 10, and 15) is greater than the predefined value (i.e., 5). Thus, the subset of words in this case may include the words "Morning", and "Thanks", only.

Figure 6:
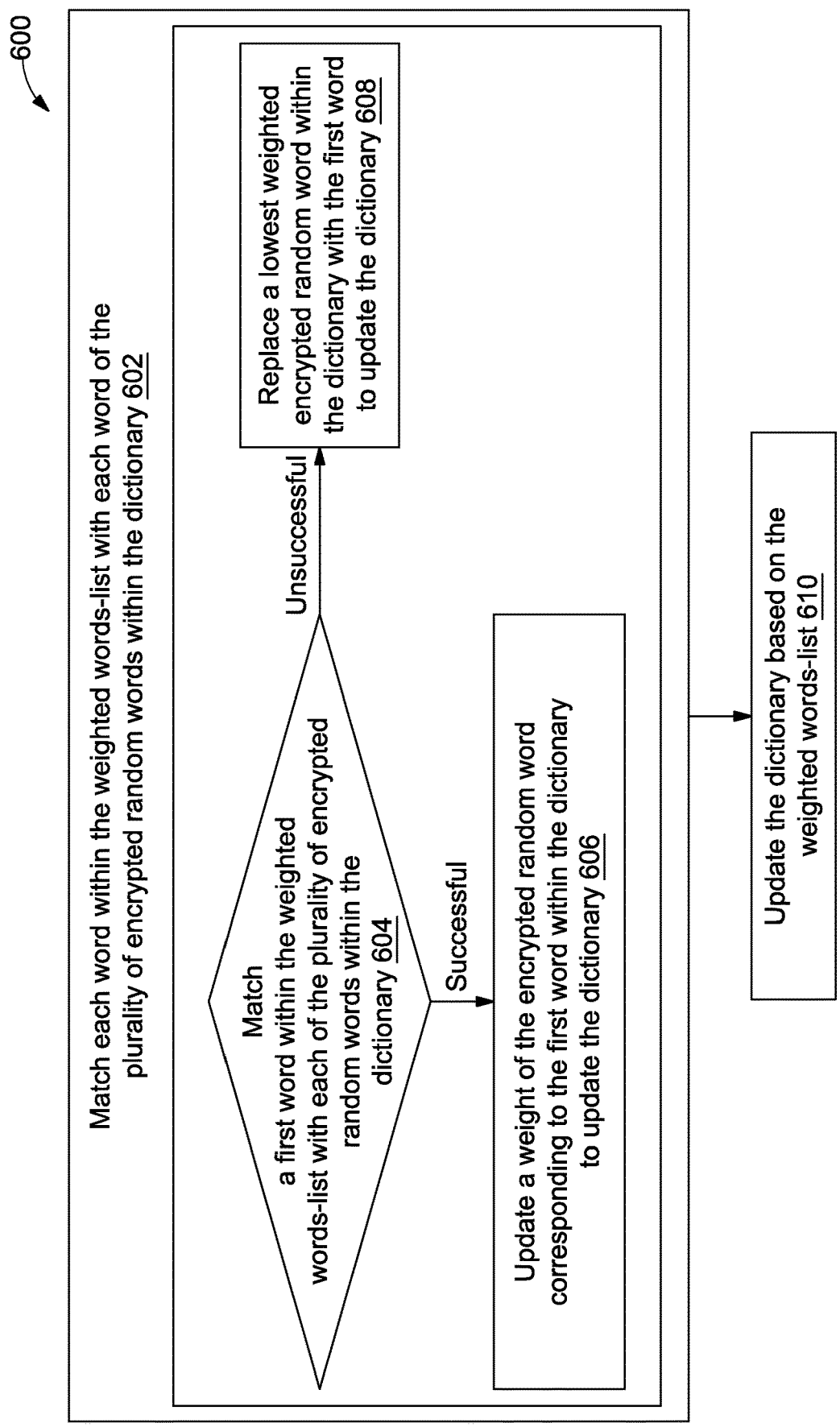
FIG. 6 is a flowchart of a method for updating the dictionary, in accordance with some embodiments of the present disclosure.

Referring now to FIG. 6, a method 600 for updating the dictionary is depicted via a flowchart, in accordance with an embodiment. Each step of the process may be performed by an updating module (such as the updating module 116). FIG. 6 is explained in conjunction with FIGS. 1-5.

At step 602, each word within the weighted words-list may be matched with each word of the plurality of encrypted random words within the dictionary. For example, at step 604, a first word within the weighted words-list may be matched with each of the plurality of encrypted random words within the dictionary. When the matching of the first word with an encrypted random word is successful, a weight of the encrypted random word corresponding to the first word may be updated, to update the dictionary, at step 606.

Further, at step 608, when the matching of the first word with any of the plurality of the encrypted random words is unsuccessful, a lowest weighted encrypted random word with the oldest update time within the dictionary may be replaced with the first word to update the dictionary. For example, consider a scenario that there are two words in the dictionary having the same lowest weight. In that case, a word with the oldest update time of the two words may be selected for replacement with the first word. Thereafter, at step 610, the dictionary may be updated based on the weighted words-list and matching.

Figure 7:
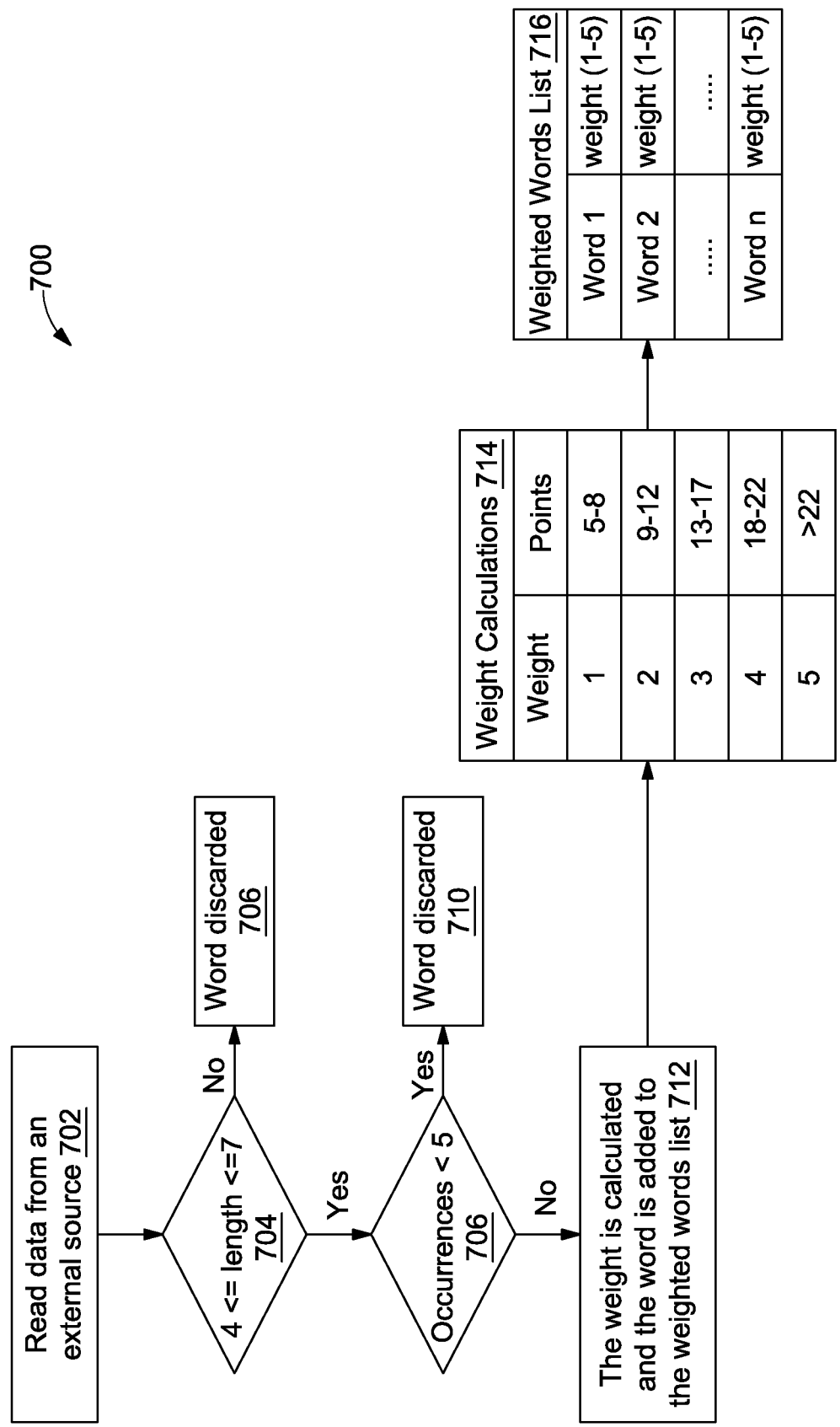
FIG. 7 is a control logic for generating a weighted words-list, in accordance with some embodiments of the present disclosure.

Referring now to FIG. 7, a control logic 700 for generating a weighted words-list is illustrated, in accordance with some embodiments. FIG. 7 is explained in conjunction with FIGS. 1-6. At step 702, data may be read from external sources. The data may include a plurality of words. The data may be passed further for validation. At step 704, each of the words may be validated based on a word length criteria (i.e., $4<=\text{length}<=7$). For example, words with lengths out of the range $4<=\text{length}<=7$ may be filtered out or discarded, at step 706. In this case, the validation may be considered as unsuccessful validation.

Further, at step 708, words passing the length criteria or words with lengths within the range $4<=\text{length}<=7$ may be further validated based on a frequency criteria (i.e., occurrence<5). At step 710, words failing to fulfil this frequency criteria may be discarded. Further, word passing the frequency criteria may be passed for weight calculations. For example, the words occurring more than five times may be passes for weight calculation. At step 712, weight calculations 714 corresponding to the words may be performed, and the words may be added to a weighted word list 716. The weight calculations 714 may be performed in such a way that, one weight point is awarded for each occurrence and one weight point is awarded for each special character.

For example, for a word "M@rning" occurring eight times, the weight points awarded may be "9". In this case, one weight point may be awarded for the special character "@" plus eight weight points for eight time occurrence (i.e., the frequency of occurrence) of the word "M@rning". Further, weight corresponding to the weight points may be calculated. For example, weight "1" may be assigned for weight points "5-8", weight "2" may be assigned for weight points "9-12", weight "3" may be assigned for weight points "13-17", weight "4" may be assigned for weight points "18-22", weight "5" may be assigned for weight points ">22". Thus, in the example, the weight assigned may be "2" as the weight points assigned is "9" The weights corresponding to the weight points may be assigned to generate the weighted word list 716. The weighted word list 716 may include words and their corresponding weights.

Figure 8:
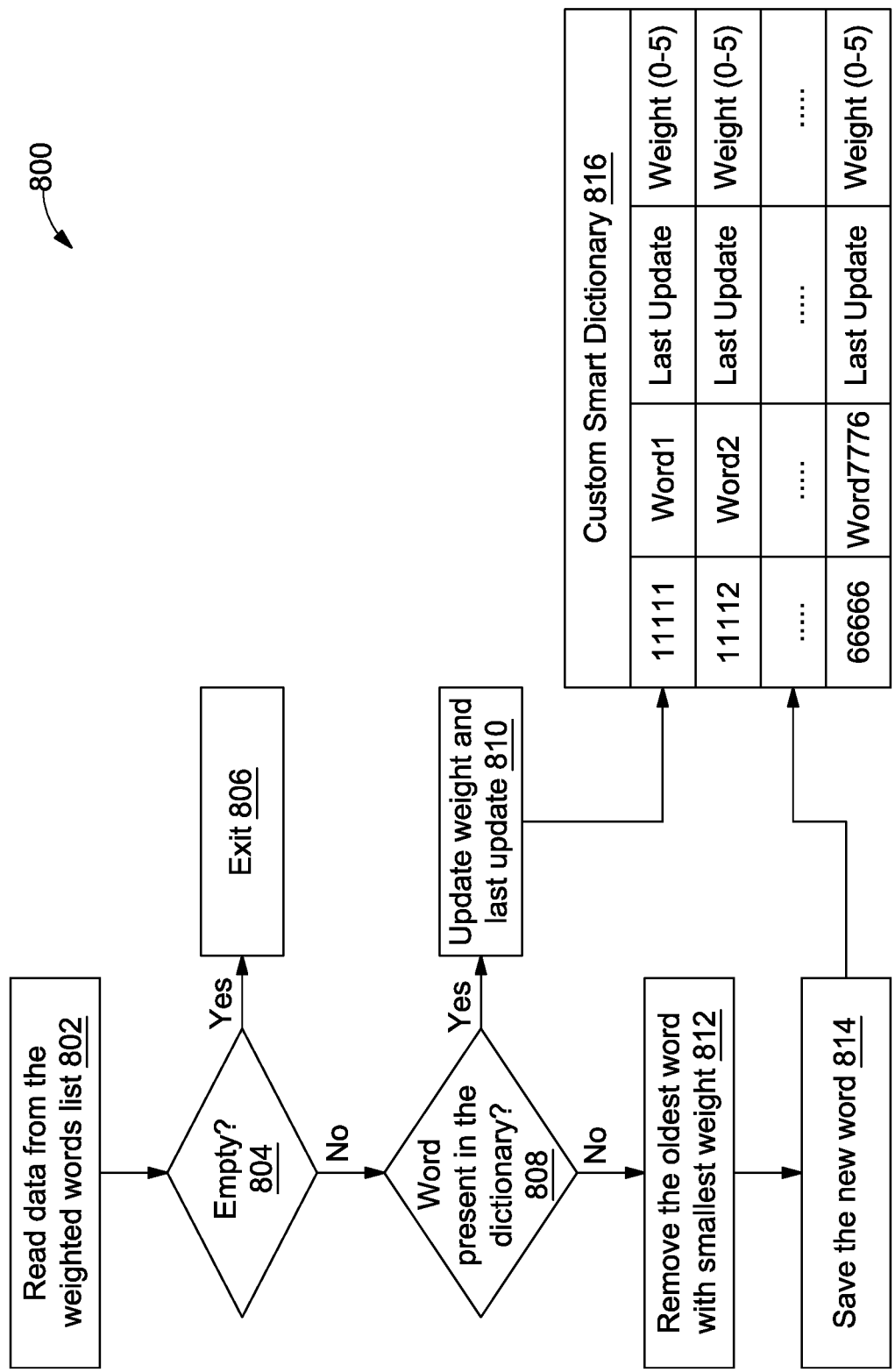
FIG. 8 is a control logic for updating a dictionary based on a weighted words-list, in accordance with some embodiments of the present disclosure.

Referring now to FIG. 8, a control logic 800 for updating a dictionary based on a weighted words-list is illustrated, in accordance with some embodiments. FIG. 8 is explained in conjunction with FIGS. 1-7. At step 802, the words in the weighted word list 716 may be read. Further, at step 804, it may be checked if the weighted word list 716 is empty or not. In case the weighted word list 716 is empty, at step 806, the process may stop. Alternatively, when the weighted word list 716 is not empty, a presence of each word of the weighted word list may be checked in the dictionary. For example, at step 808, a presence of a word of the weighted word list 716 may be checked in the dictionary. In case the word is present in the dictionary, at step 810, a weight of that word and corresponding update time may be updated in the dictionary based on the weight of the word in the weighted word list 716, to update the dictionary.

In case the word is absent in the dictionary, the oldest word with the smallest weight in the dictionary may be removed, at step 812. Further, at step 814, the word of the weighted word list 716 which is not present in the dictionary may be added to the dictionary in place of the removed word, in order to generate a custom smart dictionary 816. Therefore, it should be noted that a number of words in the custom smart dictionary 816 may always be fixed. Thus, in order to add one word in the custom smart dictionary 816, one word needs to be removed. For example, the custom smart dictionary 816 includes a total of "7776" words. Each word in the custom smart dictionary 816 may be identified by a 5-digit number, each digit from 1 to 6 (i.e., the lowest number "11111", and the highest number "66666"), to facilitate selection of random words in a dice-ware fashion. A word at number "11111" may be "Word 1", at number "11112" may be "Word 2", and at number "66666" may be "Word 7776". Weights corresponding to the words may lie in between a range "0-5". A zero (i.e., "0") weight represents a preinstalled word. These are just exemplary values taken for ease of explanation. However, the values may be different for different scenarios and application of the system.

Figure 9:
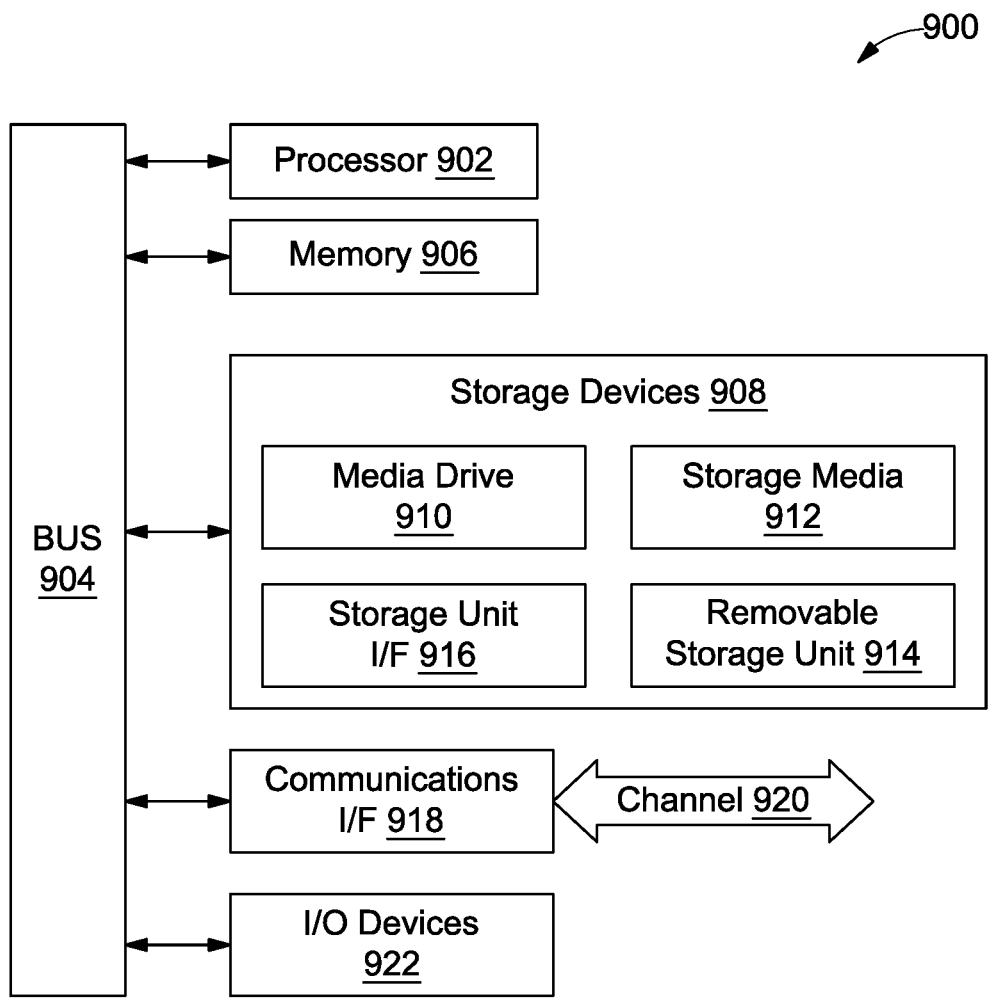
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, an exemplary computing system 900 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 900 may represent, for example, a user device such as a desktop, a laptop, a mobile phone, personal entertainment device, DVR, and so on, or any other type of special or general-purpose computing device as may be desirable or appropriate for a given application or environment. The computing system 900 may include one or more processors, such as a processor 902 that may be implemented using a general or special purpose processing engine such as, for example, a microprocessor, microcontroller or other control logic. In this example, the processor 902 is connected to a bus 904 or other communication medium. In some embodiments, the processor 902 may be an AI processor, which may be implemented as a Tensor Processing Unit (TPU), or a graphical processor unit, or a custom programmable solution Field-Programmable Gate Array (FPGA).

The computing system 900 may also include a memory 906 (main memory), for example, Random Access Memory (RAM) or other dynamic memory, for storing information and instructions to be executed by the processor 902. The memory 906 also may be used for storing temporary variables or other intermediate information during execution of instructions to be executed by the processor 902. The computing system 900 may likewise include a read only memory ("ROM") or other static storage device coupled to bus 904 for storing static information and instructions for the processor 902.

The computing system 900 may also include a storage device 908, which may include, for example, a media drives 905 and a removable storage interface. The media drive 910 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 912 may include, for example, a hard disk, magnetic tape, flash drive, or other fixed or removable medium that is read by and written to by the media drive 910. As these examples illustrate, the storage media 912 may include a computer-readable storage medium having stored there in particular computer software or data.

In alternative embodiments, the storage devices 908 may include other similar instrumentalities for allowing computer programs or other instructions or data to be loaded into the computing system 900. Such instrumentalities may include, for example, a removable storage unit 914 and a storage unit interface 916, such as a program cartridge and cartridge interface, a removable memory (for example, a flash memory or other removable memory module) and memory slot, and other removable storage units and interfaces that allow software and data to be transferred from the removable storage unit 914 to the computing system 900.

The computing system 900 may also include a communications interface 918. The communications interface 918 may be used to allow software and data to be transferred between the computing system 900 and external devices. Examples of the communications interface 918 may include a network interface (such as an Ethernet or other NIC card), a communications port (such as for example, a USB port, a micro USB port), Near field Communication (NFC), etc. Software and data transferred via the communications interface 918 are in the form of signals which may be electronic, electromagnetic, optical, or other signals capable of being received by the communications interface 918. These signals are provided to the communications interface 918 via a channel 920. The channel 920 may carry signals and may be implemented using a wireless medium, wire or cable, fiber optics, or other communications medium. Some examples of the channel 920 may include a phone line, a cellular phone link, an RF link, a Bluetooth link, a network interface, a local or wide area network, and other communications channels.

The computing system 900 may further include Input/Output (I/O) devices 922. Examples may include, but are not limited to a display, keypad, microphone, audio speakers, vibrating motor, LED lights, etc. The I/O devices 922 may receive input from a user and also display an output of the computation performed by the processor 902. In this document, the terms "computer program product" and "computer-readable medium" may be used generally to refer to media such as, for example, the memory 906, the storage devices 908, the removable storage unit 914, or signal(s) on the channel 920. These and other forms of computer-readable media may be involved in providing one or more sequences of one or more instructions to the processor 902 for execution. Such instructions, generally referred to as "computer program code" (which may be grouped in the form of computer programs or other groupings), when executed, enable the computing system 900 to perform features or functions of embodiments of the present invention.

In an embodiment where the elements are implemented using software, the software may be stored in a computer-readable medium and loaded into the computing system 900 using, for example, the removable storage unit 914, the media drive 910 or the communications interface 918. The control logic (in this example, software instructions or computer program code), when executed by the processor 902, causes the processor 902 to perform the functions of the invention as described herein.

Various embodiments provide a method and system for customizing a dictionary for a user. The disclosure helps in providing a user specific dictionary which can be used further to generate passphrases. These passphrases are not only easy to remember for the user but also difficult to breach for the hackers. The disclosure updates the dictionary based on user specific collected data (including various words that the user frequently uses (for example, based on user's interests or personal language)), from various platforms. When the data is collected, even personal ways of writing abbreviation of common words, slang terms, names of brands, and nicknames are also considered, thereby helping to create a customized and private starting base which differs from any dictionary based on common words, frequently used by attackers. Hence, the passphrases generated using these words may be easy to remember for the user.

Further, a main concern about such a use of personal data could come from security itself. For example, a lost device may represent a security breach, however in case of the customization device disclosed in the present disclosure, there is no further security issue as in any other common lost-device situation. It should be noted that passphrases may not be stored on the customization device except those already stored in other applications. Besides, the personal dictionary (updated dictionary based on user preferences) itself would be encrypted, in order to make the data files useless to any intruder. Additionally, even in case such encryption would be forced, the violator would only own a base dictionary that has been used to create passphrases. The disclosure provides recommendations based on the updated dictionary to generate passphrases which are easy to memorize but at the same time extremely difficult to be guessed manually or breached by any other source of attack ensuring optimum level of safety.

The collected data may be stored with the highest level of encryption inside a device, and all data transfer would be protected by a further encryption through a protocol. Even if the device is stolen or internet data traffic is somehow hijacked, the possible security may not be affected, since the data is stored only in the dictionary, and the generated passphrases are not stored in the device. Additionally, a starting point of the passphrase generation in the present disclosure is a customized dictionary, which is built differently for every user, thus it would not lower security standards.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for customizing a dictionary for a user, the method comprising:
capturing, by a customisation device, data with respect to the user from a plurality of platforms, wherein the data is indicative of user specific words preferences;
generating, by the customisation device, a words-list comprising a plurality of words based on the captured data;
determining, by the customisation device, a set of words from the words-list based on a predefined word-length criteria;
determining, by the customisation device, a subset of words from the set of words based on a predefined word-frequency criteria;
assigning, by the customisation device, a weight corresponding to each word of the subset of words to generate a weighted words-list based on presence of special characters in each word of the subset of words and a frequency of occurrence of each word in the subset of words; and dynamically updating, by the customisation device, the dictionary based on the weighted words-list, wherein the dictionary comprises a plurality of encrypted random words.

2. The method of claim 1, further comprising providing recommendations to the user for generating passphrases based on the updated dictionary.

3. The method of claim 1, wherein determining the set of words comprises:
for the set of words, validating each word from the plurality of words of the words-list based on the predefined word-length criteria; and
at least one of:
selecting a word from the plurality of words when the validation of the word is successful; or
rejecting the word from the plurality of words when the validation of the word is unsuccessful.

4. The method of claim 1, wherein determining the subset of words comprises:
for the subset of words, validating each word within the set of words based on the predefined word-frequency criteria; and
at least one of:
selecting a word from the set of words, when the validation of the word is successful; or
rejecting the word from the set of words when the validation of the word is unsuccessful.

5. The method of claim 1, further comprising considering the dictionary as the updated dictionary when the weighted words-list is empty.

6. The method of claim 1, wherein updating the dictionary comprises matching each word within the weighted words-list with each word of the plurality of encrypted random words within the dictionary.

7. The method of claim 6, wherein matching the each word comprises:
matching a first word within the weighted words-list with each of the plurality of encrypted random words within the dictionary; and
at least one of:
upon successful matching of the first word with an encrypted random word, updating a weight of the encrypted random word corresponding to the first word within the dictionary to update the dictionary; or
upon unsuccessful matching of the first word with any of the plurality of encrypted random words, replacing a lowest weighted encrypted random word within the dictionary with the first word to update the dictionary.

8. The method of claim 1, wherein the plurality of platforms comprises key logging services, social media platforms, messaging platforms, and applications.

9. A system for customizing a dictionary for a user, the system comprising:
a processor; and
a memory communicatively coupled to the processor, wherein the memory stores processor instructions, which when executed by the processor, cause the processor to:
capture data with respect to the user from a plurality of platforms, wherein the data is indicative of user specific words preferences;
generate a words-list comprising a plurality of words based on the captured data;
determine a set of words from the words-list based on a predefined word-length criteria;
determine a subset of words from the set of words based on a predefined word-frequency criteria;
assign a weight corresponding to each word of the subset of words to generate a weighted words-list based on presence of special characters in each word of the subset of words and a frequency of occurrence of each word in the subset of words; and
dynamically update the dictionary based on the weighted words-list, wherein the dictionary comprises a plurality of encrypted random words.

10. The system of claim 9, wherein the processor instructions, on execution, further cause the processor to provide recommendations to the user for generating passphrases based on the updated dictionary.

11. The system of claim 9, wherein the processor instructions, on execution, further cause the processor to determine the set of words by:
for the set of words, validating each word from the plurality of words of the words-list based on the predefined word-length criteria; and
at least one of:
selecting a word from the plurality of words when the validation of the word is successful; or
rejecting the word from the plurality of words when the validation of the word is unsuccessful.

12. The system of claim 9, wherein the processor instructions, on execution, further cause the processor to determine the subset of words by:
for the subset of words, validating each word within the set of words based on the predefined word-frequency criteria; and
at least one of:
selecting a word from the set of words, when the validation of the word is successful; or
rejecting the word from the set of words when the validation of the word is unsuccessful.

13. The system of claim 9, wherein the processor instructions, on execution, further cause the processor to consider the dictionary as the updated dictionary when the weighted words-list is empty.

14. The system of claim 9, wherein the processor instructions, on execution, further cause the processor to update the dictionary by matching each word within the weighted words-list with each word of the plurality of encrypted random words within the dictionary.

15. The system of claim 14, wherein the processor instructions, on execution, further cause the processor to match each word by:
matching a first word within the weighted words-list with each of the plurality of encrypted random words within the dictionary; and
at least one of:
upon successful matching of the first word with an encrypted random word, updating a weight of the encrypted random word corresponding to the first word within the dictionary to update the dictionary; or
upon unsuccessful matching of the first word with any of the plurality of encrypted random words, replacing a lowest weighted encrypted random word within the dictionary with the first word to update the dictionary.

16. The system of claim 9, wherein the plurality of platforms comprises key logging services, social media platforms, messaging platforms, and applications.

17. A non-transitory computer-readable medium storing computer-executable instructions customizing a dictionary for a user, the computer-executable instructions configured for:
- capturing data with respect to the user from a plurality of platforms, wherein the data is indicative of user specific words preferences;
- generating a words-list comprising a plurality of words based on the captured data;
- determining a set of words from the words-list based on a predefined word-length criteria;
- determining a subset of words from the set of words based on a predefined word-frequency criteria;
- assigning a weight corresponding to each word of the subset of words to generate a weighted words-list based on presence of special characters in each word of the subset of words and a frequency of occurrence of each word in the subset of words; and
- dynamically updating the dictionary based on the weighted words-list, wherein the dictionary comprises a plurality of encrypted random words.

18. The non-transitory computer-readable medium of the claim 17, wherein the computer-executable instructions further configured for providing recommendations to the user for generating passphrases based on the updated dictionary.

19. The non-transitory computer-readable medium of the claim 17, wherein the computer-executable instructions further configured for determining the set of words by:
- for the set of words, validating each word from the plurality of words of the words-list based on the predefined word-length criteria; and
- at least one of:
  - selecting a word from the plurality of words when the validation of the word is successful; or
  - rejecting the word from the plurality of words when the validation of the word is unsuccessful.

20. The non-transitory computer-readable medium of the claim 17, wherein the computer-executable instructions further configured for determining the subset of words by:
- for the subset of words, validating each word within the set of words based on the predefined word-frequency criteria; and
- at least one of:
  - selecting a word from the set of words when the validation of the word is successful; or
  - rejecting the word from the set of words when the validation of the word is unsuccessful.

* * * * *